Figure 6:
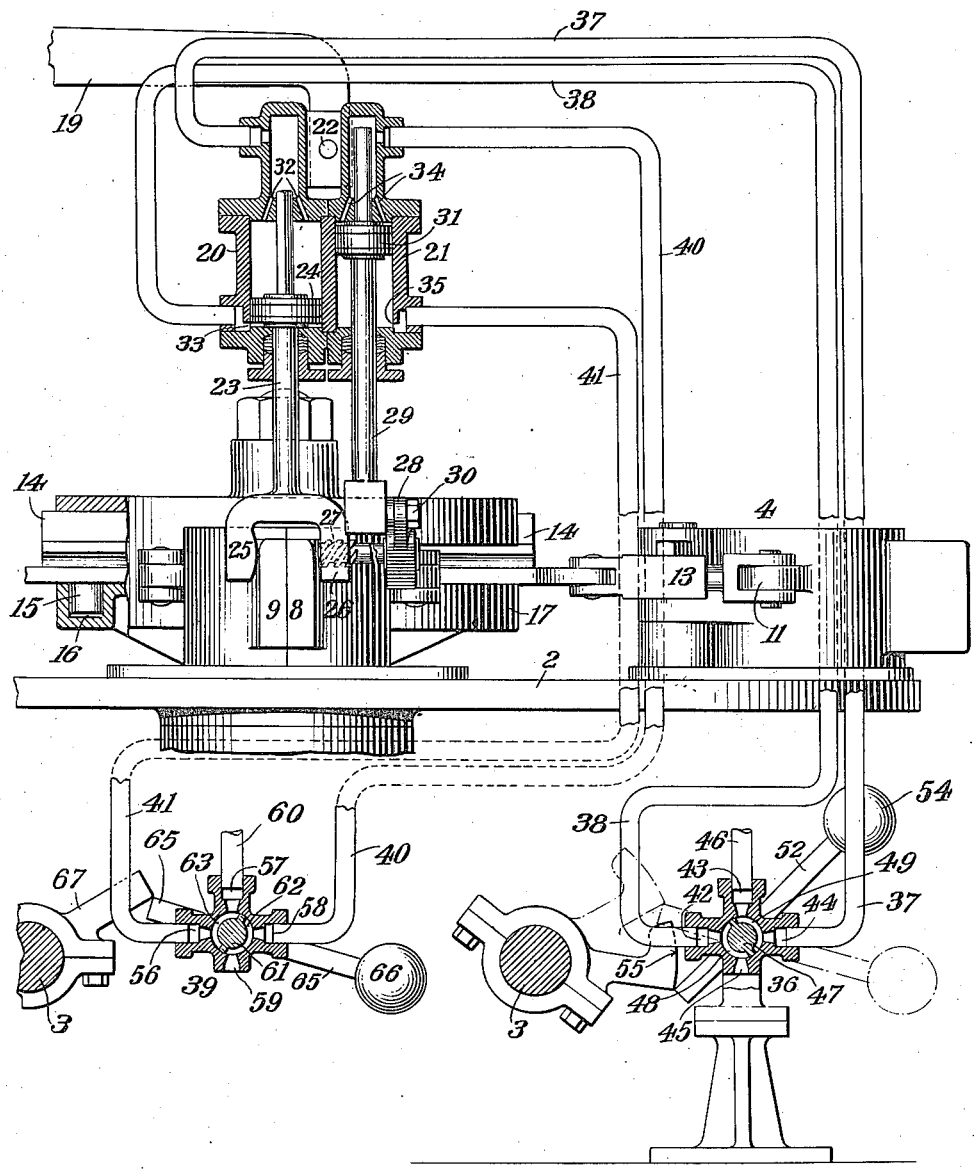

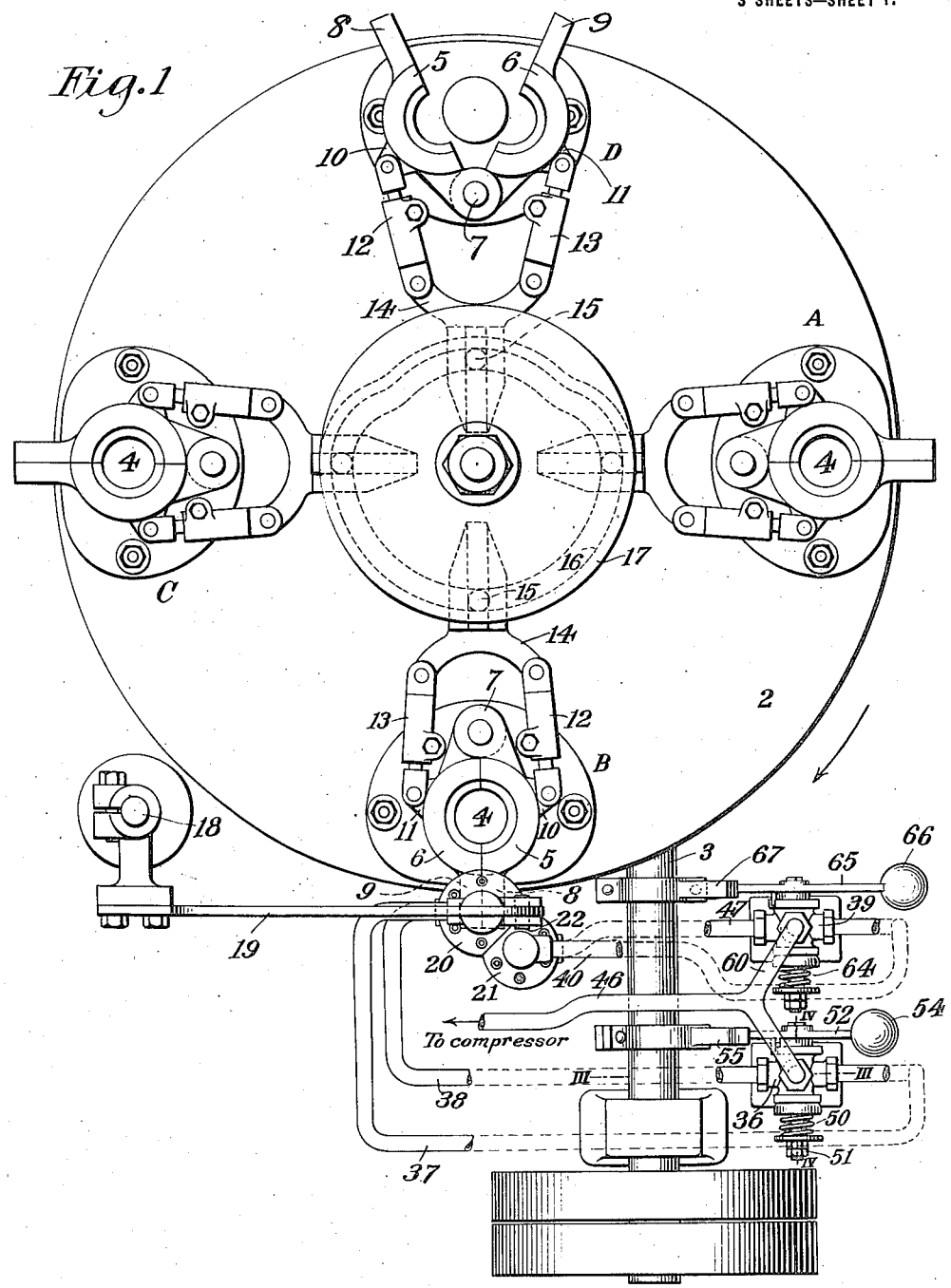

J. PROEGER.
GLASS MOLD LOCK.
APPLICATION FILED SEPT. 24, 1913.
1,141,653.
Patented June 1, 1915.
3 SHEETS—SHEET 2.
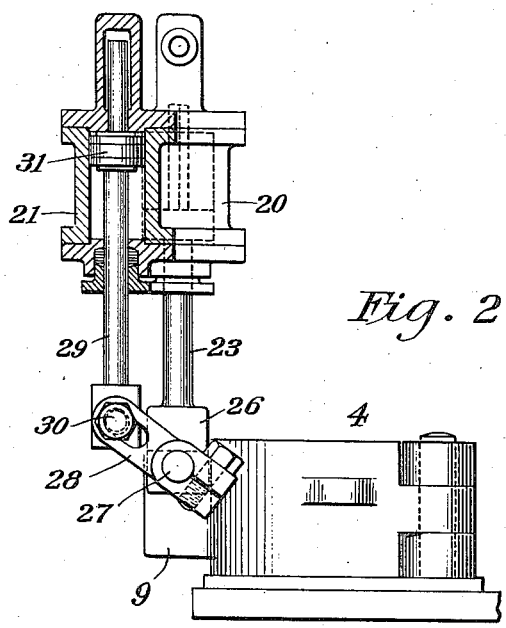
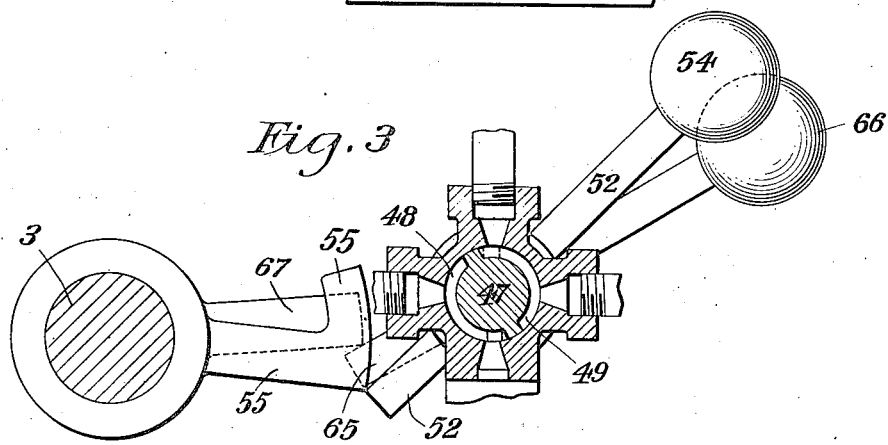
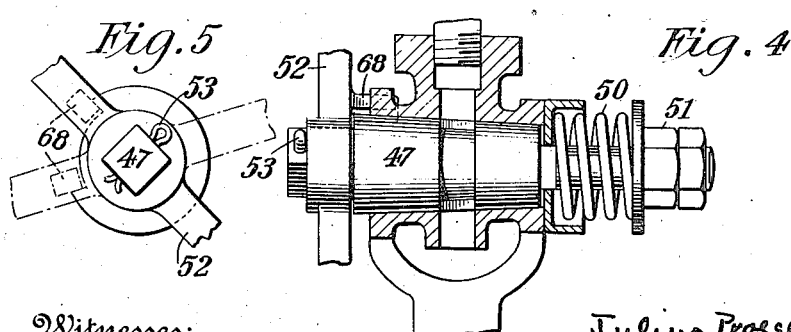
Witnesses:
Marguerite Kunsla
H. E. Long
Julius Proeger Inventor
By his Attorney
Alan W. Mann.

J. PROEGER.
GLASS MOLD LOCK.
APPLICATION FILED SEPT. 24, 1913.

1,141,653.

Patented June 1, 1915.
3 SHEETS—SHEET 3.

Witnesses:
Marguerite Pensels
H. E. Long

Julius Proeger Inventor
By his Attorneys
Alan W. Mann

UNITED STATES PATENT OFFICE.

JULIUS PROEGER, OF PITTSBURGH, PENNSYLVANIA, ASSIGNOR OF ONE-HALF TO CHARLES N. BRADY, OF WASHINGTON, PENNSYLVANIA.

GLASS-MOLD LOCK.

1,141,653.

Specification of Letters Patent.

Patented June 1, 1915.

Application filed September 24, 1913. Serial No. 791,465.

*To all whom it may concern:*

Be it known that I, JULIUS PROEGER, a citizen of the United States, and a resident of Pittsburgh, Allegheny county, Pennsylvania, have invented a new and Improved Glass-Mold Lock, of which the following is a specification, reference being had to the accompanying drawings, in which—

Figure 1 is a plan view of a mold table, equipped with a lock embodying my invention; Fig. 2 is a profile partly in section showing one of the molds in a partly locked position; Fig. 3 is a section on broken line III—III of Fig. 1; Fig. 4 is a section on broken line IV—IV of Fig. 1; Fig. 5 is a profile view of the valve shown in Fig. 4; and Fig. 6 is a profile view of the mold table and lock partly in section showing the valves of the lock diagrammatically.

My invention relates to a lock for glass molds used in conjunction with a rotating molding table, and aims to provide means which will automatically lock the molds during the time pressure is being exerted to form the object in the mold, and then unlock the mold so that as the table revolves the mold may be allowed to open.

Revolving tables carrying molds which automatically open and close have been manufactured heretofore, but the automatic means of closing the mold does not hold the movable parts thereof tightly enough together to prevent fins or thin films of glass being formed which renders the objects being manufactured unsightly. It has, therefore, been necessary to have attendants manually lock the molds before plunger pressure is exerted therein and unlock the molds so that they might open.

By my invention I aim to produce a device in which the locking and unlocking is accomplished mechanically and is properly timed with the other steps of manufacture.

Referring to the drawings 2 is a mold table of usual form, which is caused to rotate intermittently by the shaft 3 and any well-known form of gearing, which is not shown in the drawings.

On the mold table 2 are the molds 4 consisting of two halves 5 and 6, which are pivoted at the point 7, and which have projections 8 and 9 extending beyond the periphery of the mold table 2.

If desired molds divided into more than two parts may be used, in which event each part will have a projection similar to the projections 8 and 9 as is now customary in the art.

Attached to the halves 5 and 6 are the lugs 10 and 11, to which are pivoted the arms 12 and 13. These arms 12 and 13 may be made each of one piece of metal, or they may be made extensible, so that the closing of the mold may be exactly adjusted. The arms 12 and 13 are in turn pivoted to the draw bar 14. This bar is slidably attached to the table 2, and carries on its under surface the roller 15. This roller moves in the cam track 16 of the fixed plate 17. When the molds 4 are in the positions A, B and C, the roller 15, traveling in the cam track 16 will keep the draw bar 14 relatively far from the center of the mold table 2, but as the molds move toward the position D the roller 15 following the course of the cam track 16 moves the draw bar 14 toward the center of the table and this draw bar, operating through the arms 12 and 13, opens the two halves 5 and 6 of the mold 4, so that the object produced may be readily removed. Then as the mold progresses on to the pouring position A, the roller once more returns toward the periphery of the plate 17, taking with it the draw bar 14, and thus the mold is closed.

In my drawings I do not show either the pouring apparatus or the pressing apparatus, but these may be of any well known construction, and I prefer to have the pouring apparatus located at the position A and the pressing plunger should be located at the position B.

When the pressing plunger which may be geared to the shaft 3, is traveling into the mold 4, it is necessary that the parts 5 and 6 be held tightly together. I have, therefore, provided a lock for the mold which will hold the extensions 8 and 9 in close proximity. This lock is constructed as follows: To the bearings 18 is pivoted the arm 19, to which in turn the cylinders 20 and 21, which are preferably cast integral, are pivoted by the pin 22.

Within the cylinder 20 moves the plunger 23, having a plunger head 24 of usual construction.

At its lower end the plunger 23 has arms 25 and 26 which are adapted to grasp the extensions 8 and 9 of the mold 4. I prefer to have the interior face of the arm 25 beveled as shown in Fig. 5, so that as the plunger 23 moves downward, a slight preliminary pressure will be exerted in case the parts 5 and 6 of the mold 4 were not completely closed by the action of the roller 15 and the cam track 16.

In the arm 26 is the screw pin 27, which has its thread cut at a very high pitch, so that a slight rotation of this pin 27 will cause it to move a considerable distance either toward or away from the arm 25.

To the outer end of the pin 27 is clamped the arm 28, to which in turn the plunger 29 is slidably pivoted by the bolt 30. This plunger 29 has a head 31, which moves in the cylinder 21.

In the cylinder 20 are the ports 32 and 33, and in the cylinder 21 are the ports 34 and 35. The ports 32 and 33 are connected to the four-way valve 36 by the pipes 37 and 38 respectively, and the ports 34 and 35 are connected to the four-way valve 39 by the pipes 40 and 41 respectively.

In the valve 36 are the four ports 42, 43, 44 and 45, of these ports 42 admits to pipe 38; port 43 admits to pipe 46, which is connected to an air compressor of ordinary construction; port 44 admits to pipe 37; and port 45 is open to the atmosphere.

Within the valve 36 is the core 47, which has its central portion partly cut away to form the apertures 48 and 49. The core 47 I prefer to have made in the shape of a truncated cone, as shown in Fig. 4. This core is held in the valve 36 by the spring 50, which may be adjusted by the nuts 51. At its larger end the core 47 is squared, and on this squared portion the lever 52 is fastened by the cotter pin 53.

On one end of the lever 52 is the weight 54, and the other end of the lever 52 is adapted to co-act with the cam 55, which is keyed to the shaft 3. In like manner the valve 39 has ports 56, 57, 58 and 59. The port 56 admits to pipe 41; port 57 admits to pipe 60, which is a branch of pipe 46, as shown in Fig. 1; port 58 admits to pipe 40 and port 59 admits to atmosphere. Valve 39 likewise has a core 61 with apertures 62 and 63. This core 61 is held in the valve 39 by the spring 64, and has attached to it the lever 65, carrying the weight 66. The lever 65 is adapted to co-act with the cam 67, which is attached to the shaft 3. The lever 52 carries a lug 68, which contacts with the valve 36 to limit the movement of the lever 52 as shown in Fig. 5, and the lever 65 has a similar stop to limit its movement. The cams 55 and 67 are attached to the shaft 3 in such a position that when the table 2 is rotated the weights 54 and 66 will remain lowered. When the weights are thus lowered the ports 42 and 43 will be connected by the aperture 48 and the ports 44 and 45 will be connected by the aperture 49. In like manner ports 56 and 57 will be connected by the aperture 62, and ports 58 and 59 will be connected by the aperture 63. When the valves are in this position it will be seen that ports 32 and 34 will be open to the atmosphere, and pressure will be admitted into the cylinders 20 and 21 through the ports 33 and 35, and this pressure will hold the plungers 23 and 29 in raised position. As the mold table comes to rest the cam 55 moves into the position shown in dotted lines in Fig. 6 and as this cam continues to rotate the arm 52, together with the core 47, is moved into the position shown in solid lines in Fig. 6. In this position port 42 is connected to port 45, and port 43 is connected to port 44, whereby port 33 is connected to the atmosphere, and pressure from the air compressor is admitted into port 32 and the plunger 23 is driven down so that the arms 25 and 26 embrace the extensions 8 and 9 of the mold 4. Immediately thereafter the cam 67 co-acts with the lever 65 to rotate the core 61 so that port 56 is connected to port 59 and port 57 is connected to port 58, whereby port 35 is opened to the atmosphere and pressure from the air compressor is admitted into port 34. This pressure drives down plunger 29, which, acting through the arm 28, rotates the screw pin 27 and drives it toward the arm 25, whereby a great pressure is exerted to hold the extensions 8 and 9 together and thus keep the mold closed. While the lock is in this position plunger pressure is exerted in the mold.

At the moment that the plunger pressure is released the cam 67 has rotated so that it releases the arm 65. Thereupon the weight 66 falls and the core 61 is revolved to the first position described, so that the air pressure will act to raise the plunger 29 and release the screw pin 27. As the cam 55 has an elongated head it will continue to coact with arm 52 until after cam 67 has allowed weight 66 to drop, but very shortly after weight 66 has dropped cam 55 releases the arm 52 whereupon the weight 54 drops and the core 47 returns to the position first described, whereupon the air pressure acts to raise plunger 25 and thus completely unlock the mold 4. At the moment that the mold 4 is unlocked the table 2 once more commences to revolve and continues to revolve until another mold is brought into the plunger position B, whereupon the lock once more comes into action.

In place of the pneumatic system which I have described, the plungers 23 and 29 may be driven mechanically or by electricity, and it is apparent that many other alterations may be made in the structure of the lock without departing from the spirit of my invention since—

What I claim is:—

1. In a lock for glass molds the combination of a fork adapted to engage portions of the mold, having arms fixed in relation to each other, a locking device connected with said fork, and automatic means for causing the said fork to engage portions of said mold and for operating said locking device.

2. A glass mold lock, comprising a fork adapted to embrace portions of the mold, a screw in one arm of said fork, and means for successively causing the said fork to embrace portions of the mold and for tightening the said screw.

3. A glass mold lock comprising two arms, means for causing the said arms to embrace portions of the mold, a secondary locking device connected with one of the said arms, and automatic means for operating the said secondary locking device.

4. A glass mold lock comprising two arms adapted to embrace portions of the mold, means for bringing the said arms into fixed position in relation to said mold, an additional locking device connected with one of the said arms, and automatic means for operating the said locking device.

5. The combination of a mold table, a driving shaft, means connected with said driving shaft to cause the mold table to rotate intermittently, divided molds on said table, projections on said molds, two arms adapted to engage said projections, a secondary locking device connected with one of said arms, and means connected with said driving shaft to cause the said arms to engage the projections on one of the molds and to operate said secondary locking device to hold the mold closed during a portion of the time that the mold is in pressing position.

6. The combination of a mold table, a driving shaft, means connected with said driving shaft to cause the mold table to rotate intermittently, divided molds on said table, projections on the said molds, a fork adapted to engage said projections, a locking device attached to said fork, and means connected with the said driving shaft to cause the fork to engage the projections on one of the molds and to operate the said locking device to hold the lock closed during a portion of the time that the mold is in pressing position.

7. The combination of a mold table, a driving shaft, means connected with said driving shaft to cause the mold table to rotate intermittently, a mold on the said table divided into a plurality of parts, the said parts being pivoted to the mold table and having projections extending toward the periphery of the mold table, a fork adapted to embrace the said projections, a locking screw in one arm of said fork, and means connected with the said driving shaft adapted to act when the mold table is at rest to cause the said fork to embrace the said projections and then to rotate the said locking screw.

JULIUS PROEGER.

Witnesses:
 B. F. RICHARDS,
 E. E. ELLIOTT.